US012334624B2

(12) United States Patent
Lin et al.

(10) Patent No.: US 12,334,624 B2
(45) Date of Patent: Jun. 17, 2025

(54) ELECTRONIC DEVICE AND ANTENNA ASSEMBLY

(71) Applicants: INVENTEC (PUDONG) TECHNOLOGY CORPORATION, Shanghai (CN); INVENTEC CORPORATION, Taipei (TW)

(72) Inventors: Hsin-Hung Lin, Taipei (TW); Yu Shu Tai, Taipei (TW); Ssu-Yu Liu, Taipei (TW); Wei-Chen Cheng, Taipei (TW)

(73) Assignees: INVENTEC (PUDONG) TECHNOLOGY CORPORATION, Shanghai (CN); INVENTEC TECHNOLOGY CORPORATION, Taipei (TW)

( * ) Notice: Subject to any disclaimer, the term of this patent is extended or adjusted under 35 U.S.C. 154(b) by 195 days.

(21) Appl. No.: 18/236,896

(22) Filed: Aug. 22, 2023

(65) Prior Publication Data

US 2024/0421464 A1 Dec. 19, 2024

(30) Foreign Application Priority Data

Jun. 16, 2023 (CN) ......................... 202310723137.9

(51) Int. Cl.
*H01Q 1/22* (2006.01)
*H01Q 1/52* (2006.01)
*H01Q 9/04* (2006.01)
*H01Q 21/08* (2006.01)

(52) U.S. Cl.
CPC ............... *H01Q 1/22* (2013.01); *H01Q 1/523* (2013.01); *H01Q 9/0407* (2013.01); *H01Q 21/08* (2013.01)

(58) Field of Classification Search
CPC .......... H01Q 1/243; H01Q 1/52; H01Q 1/521; H01Q 1/523; H01Q 21/06; H01Q 21/10; H01Q 21/28; H01Q 9/0407; H01Q 9/0414
See application file for complete search history.

(56) References Cited

U.S. PATENT DOCUMENTS 7,274,339 B2 * 9/2007 Wu .......................... H01Q 5/42 343/700 MS
10,804,602 B2 * 10/2020 Zhao .................... H04B 7/0413
2007/0001922 A1 * 1/2007 Song .................... H01Q 21/062 343/700 MS
2008/0094283 A1 * 4/2008 Mei ........................ H01Q 9/285 343/700 MS (Continued)

*Primary Examiner* — Jason M Crawford
(74) *Attorney, Agent, or Firm* — Maschoff Brennan

(57) ABSTRACT

An electronic device includes a shell and an antenna assembly. The casing has an accommodating space. The antenna assembly is located in the accommodating space, and includes a substrate, a first antenna component, a second antenna component and a third antenna component. The first antenna component, the second antenna component and the third antenna component are disposed on the substrate. The first antenna component includes a first radiation portion and a first ground portion, which are disposed on two opposite sides of the substrate. The second antenna component includes a second radiation portion and a second ground portion, which are disposed on two opposite sides of the substrate. The third antenna component includes a third radiation portion and a third ground portion, which are disposed on two opposite sides of the substrate.

10 Claims, 10 Drawing Sheets

(56) References Cited

U.S. PATENT DOCUMENTS

| | | | | |
|---|---|---|---|---|
| 2010/0156745 | A1* | 6/2010 | Andrenko | H01Q 13/10 343/848 |
| 2015/0097751 | A1* | 4/2015 | Hsu | H01Q 21/205 343/893 |
| 2017/0317419 | A1* | 11/2017 | Wu | H01Q 9/0421 |
| 2020/0235495 | A1* | 7/2020 | Yang | H01Q 1/241 |
| 2022/0200142 | A1* | 6/2022 | Zhang | H01Q 21/0006 |
| 2024/0304997 | A1* | 9/2024 | Huang | H01Q 5/30 |
| 2024/0313419 | A1* | 9/2024 | Lin | H01Q 5/378 |
| 2024/0421464 | A1* | 12/2024 | Lin | H01Q 21/28 |

* cited by examiner

ELECTRONIC DEVICE AND ANTENNA ASSEMBLY

CROSS-REFERENCE TO RELATED APPLICATIONS

This non-provisional application claims priority under 35 U.S.C. § 119(a) on Patent Application No(s). 202310723137.9 filed in China, on Jun. 16, 2023, the entire contents of which are hereby incorporated by reference.

BACKGROUND OF THE INVENTION

Technical Field of the Invention

The invention relates to an electronic device and an antenna assembly, more particularly to an eight-receiving and eight-transmitting electronic device and antenna assembly.

Description of the Related Art

With the advancement of wireless communication technology, electronic devices such as mobile phones and personal digital assistants have various functions and improved performance, and become lighter and thinner. Since the electronic devices receive and transmit signals via an antenna device, the antenna device plays an important role for the wireless communication technology.

Generally, manufacturers need to design the antenna device according to signal frequency bands applicable to electronic products such as smartphones. However, a size of the conventional antenna device is too large, so that the conventional antenna device is difficult to be mounted in the smartphones. Therefore, the manufacturers need to adjust the size of the antenna device according to the size of the inner space of the smartphone, thereby wasting a lot of time and increasing manufacturing costs additionally. Therefore, how to reduce the size of the antenna device to allow the antenna device to be accommodated in various smartphones without reducing a range of the applicable signal frequency bands of the antenna device is an important issue to be solved.

SUMMARY OF THE INVENTION

The invention provides the electronic device and the antenna assembly so as to reduce the size of the antenna device to allow the antenna device to be accommodated in various smartphones without reducing the range of the applicable signal frequency bands of the antenna device.

One embodiment of the invention provides an electronic device including a casing and an antenna assembly. The casing has an accommodating space. The antenna assembly is located in the accommodating space. The antenna assembly includes a substrate, a first antenna component, a second antenna component and a third antenna component. The first antenna component, the second antenna component and the third antenna component are disposed on the substrate. The first antenna component, the second antenna component and the third antenna component are arranged along an arrangement direction. The first antenna component includes a first radiation portion and a first ground portion. The first radiation portion and the first ground portion are disposed on two opposite sides of the substrate, respectively. The first radiation portion includes a first body part and two first head parts. The first body part extends along the arrangement direction. The two first head parts are connected to an end of the first body part. The two first head parts extend along opposite directions, respectively. The first ground portion has a first notch part. The first notch part corresponds to the first body part. The second antenna component includes a second radiation portion and a second ground portion. The second radiation portion and the second ground portion are disposed on two opposite sides of the substrate, respectively. The second radiation portion includes a second body part and a second head part. The second body part extends along the arrangement direction. The second head part is connected to an end of the second body part. The second ground portion has a second notch part. The second notch part corresponds to the second body part. The third antenna component includes a third radiation portion and a third ground portion. The third radiation portion and the third ground portion are disposed on two opposite sides of the substrate, respectively. The third radiation portion includes a third body part and a third head part. The third body part extends along the arrangement direction. The third head part is connected to an end of the third body part. An orientation of the third head part is opposite to an orientation of the second head part. The third ground portion has a third notch part. The third notch part corresponds to the third body part.

Another embodiment of the invention provides an antenna assembly including a substrate, a first antenna component, a second antenna component and a third antenna component. The first antenna component, the second antenna component and the third antenna component are disposed on the substrate. The first antenna component, the second antenna component and the third antenna component are arranged along an arrangement direction. The first antenna component includes a first radiation portion and a first ground portion. The first radiation portion and the first ground portion are disposed on two opposite sides of the substrate, respectively. The first radiation portion includes a first body part and two first head parts. The first body part extends along the arrangement direction. The two first head parts are connected to an end of the first body part. The two first head parts extend along opposite directions, respectively. The first ground portion has a first notch part. The first notch part corresponds to the first body part. The second antenna component includes a second radiation portion and a second ground portion. The second radiation portion and the second ground portion are disposed on two opposite sides of the substrate, respectively. The second radiation portion includes a second body part and a second head part. The second body part extends along the arrangement direction. The second head part is connected to an end of the second body part. The second ground portion has a second notch part. The second notch part corresponds to the second body part. The third antenna component includes a third radiation portion and a third ground portion. The third radiation portion and the third ground portion are disposed on two opposite sides of the substrate, respectively. The third radiation portion includes a third body part and a third head part. The third body part extends along the arrangement direction. The third head part is connected to an end of the third body part. An orientation of the third head part is opposite to an orientation of the second head part. The third ground portion has a third notch part. The third notch part corresponds to the third body part.

According to the electronic device and the antenna assembly disclosed by above embodiments, the first notch part, the second notch part and the third notch part correspond to the two first head parts, the second head part and the third head part, respectively. In addition, the first antenna components, the second antenna components and the third antenna components are arranged sequentially. Therefore, the size of the antenna assembly can be reduced without reducing the range of the applicable signal frequency bands of the electronic device, so that the antenna assembly is not required to be redesigned according to the size of the inner space of the smartphone. Thus, the design process of the antenna assembly can be simplified, and the manufacturing cost can be reduced.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
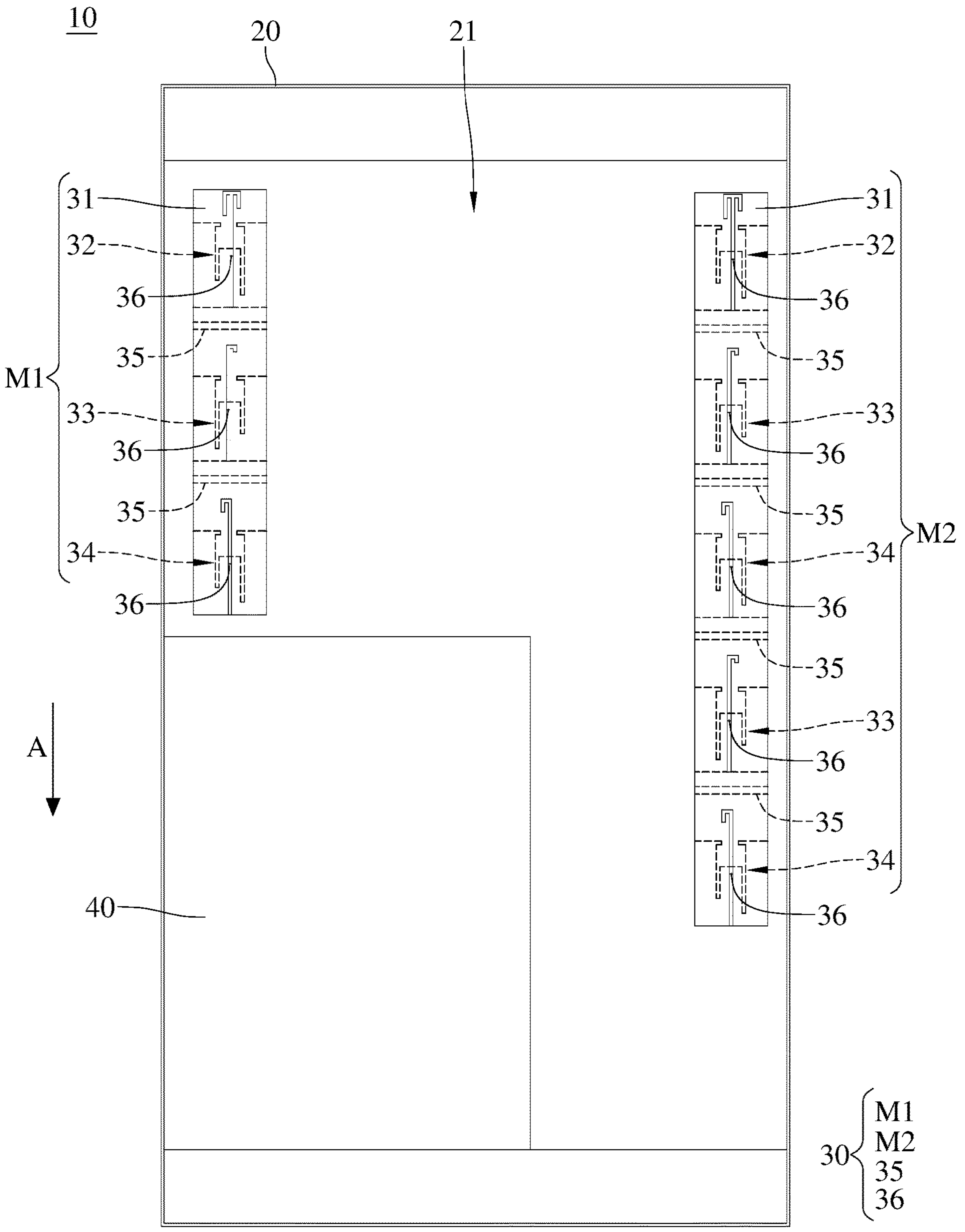
FIG. 1 is a plane view of an electronic device in accordance with one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
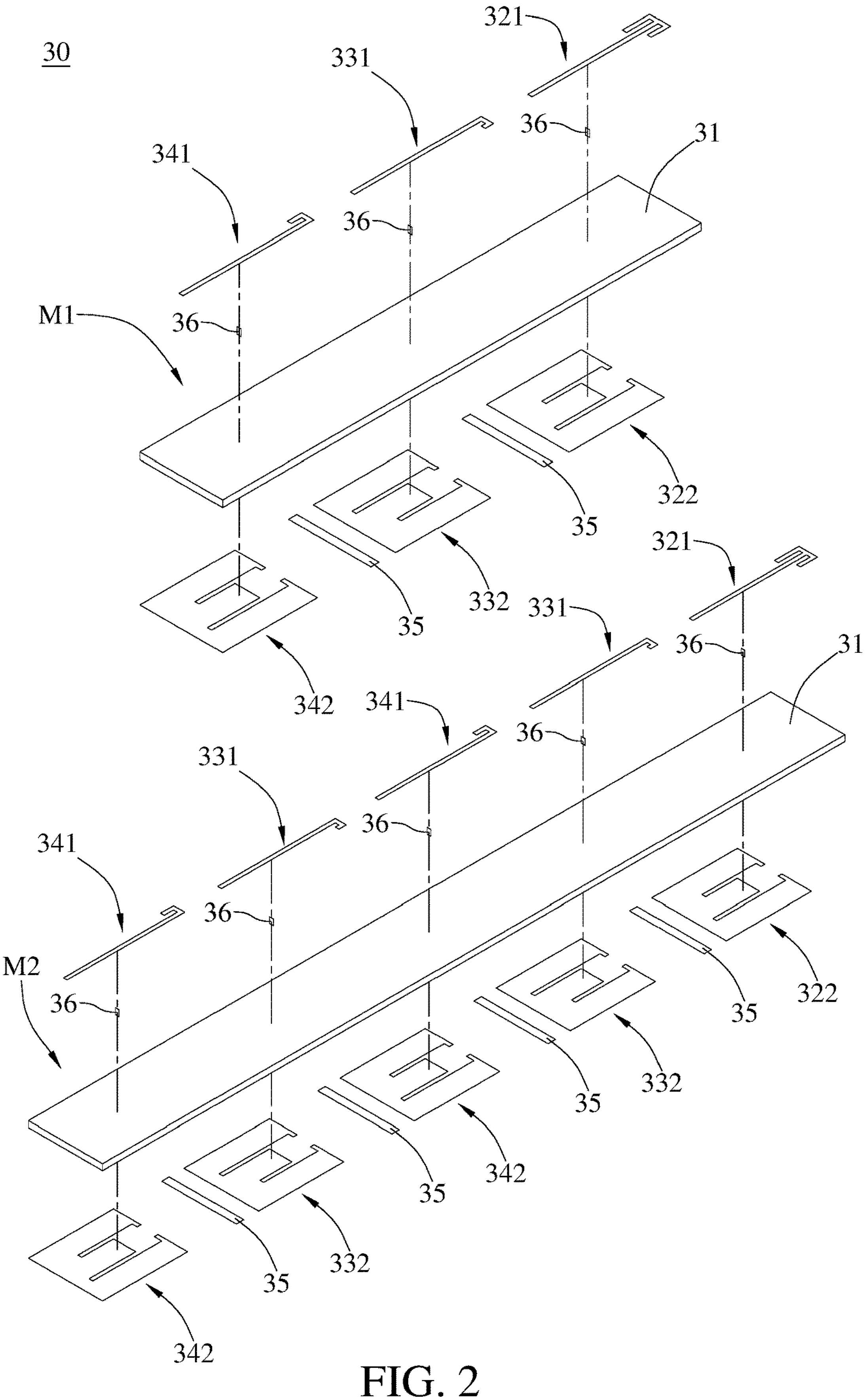
FIG. 2 is an exploded view of a first antenna subassembly and a second antenna subassembly of the electronic device in FIG. 1.

Please refer to FIG. 1 and FIG. 2, where FIG. 1 is a plane view of an electronic device 10 in accordance with one embodiment of the invention, and FIG. 2 is an exploded view of a first antenna subassembly M1 and a second antenna subassembly M2 of the electronic device 10 in FIG. 1.

In this embodiment, the electronic device 10 includes a casing 20 and an antenna assembly 30. The casing 20 has an accommodating space 21. The antenna assembly 30 is located in the accommodating space 21, and includes two substrates 31, two first antenna components 32, three second antenna components 33, three third antenna components 34, six isolation components 35 and eight feed points 36.

The two substrates 31 are made of, for example, FR-4 material. A length of one of the two substrates 31 is, for example, 58.15 millimeters (mm). A width of one of the two substrates 31 is, for example, 10 mm. A thickness of one of the two substrates 31 is, for example, 0.8 mm. A length of another one of the two substrates 31 is, for example, 100.2 mm. A width of another one of the two substrates 31 is, for example, 10 mm. A thickness of another one of the two substrates 31 is, for example, 0.8 mm.

The two first antenna components 32, the three second antenna components 33 and the three third antenna components 34 are disposed on the two substrate 31, respectively, and are arranged along an arrangement direction A. One of the two first antenna components 32, one of the three second antenna components 33 and one of the three third antenna components 34 are arranged on one of the two substrates 31 sequentially to form a first antenna subassembly M1. The other of the two first antenna component 32, another second antenna component 33, another third antenna component 34, the other second antenna component 33 and the other third antenna component 34 are arranged on the other substrate 31 sequentially to form a second antenna subassembly M2. In each of the two antenna subassemblies M1 and M2, a distance between any two adjacent ones of the first antenna component 32, the second antenna component 33 and the third antenna component 34 is, for example, 5 mm.

Figure 3:
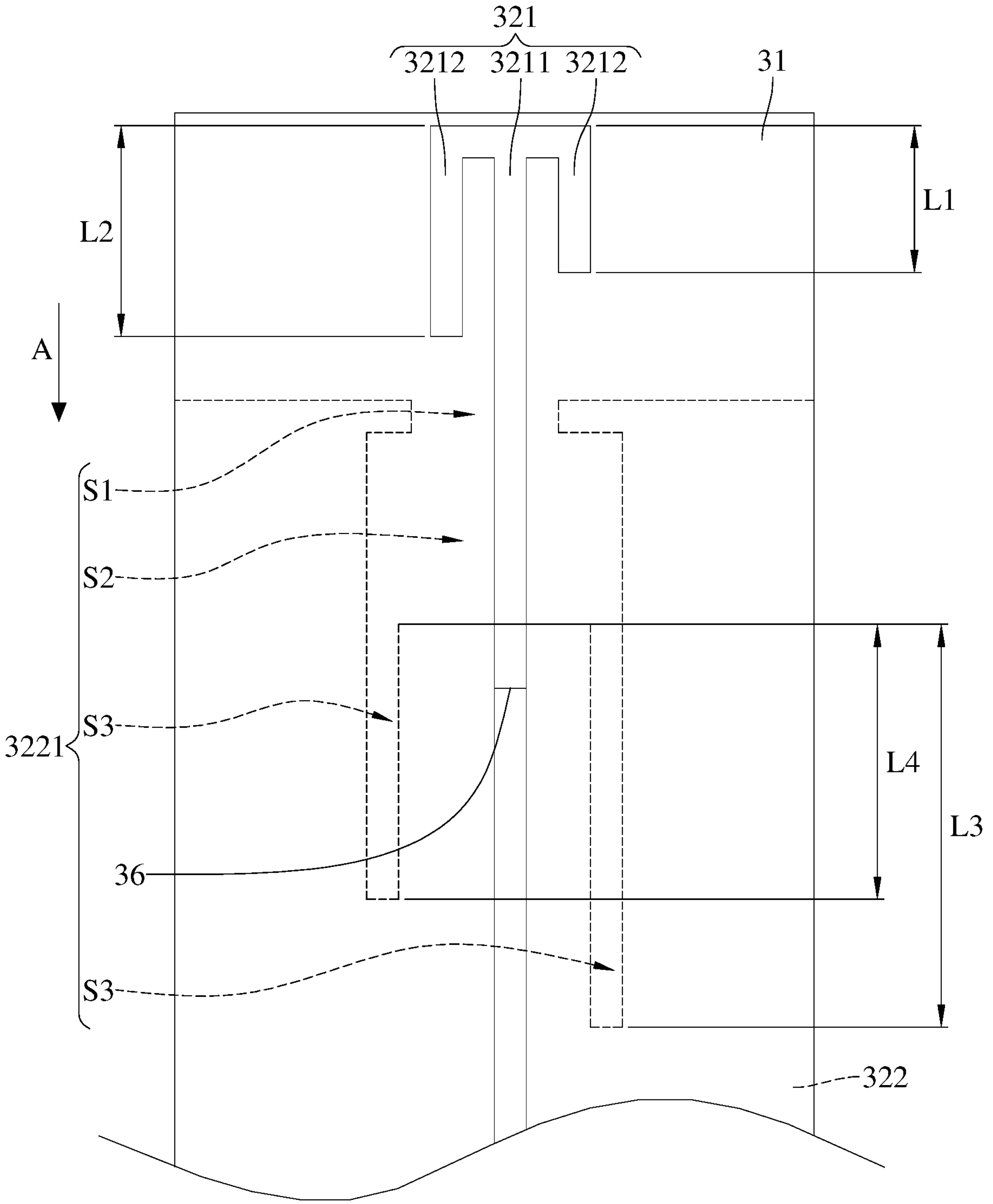
FIG. 3 is a plane view of a substrate and a first antenna component of the electronic device in FIG. 1.
Figure 4:
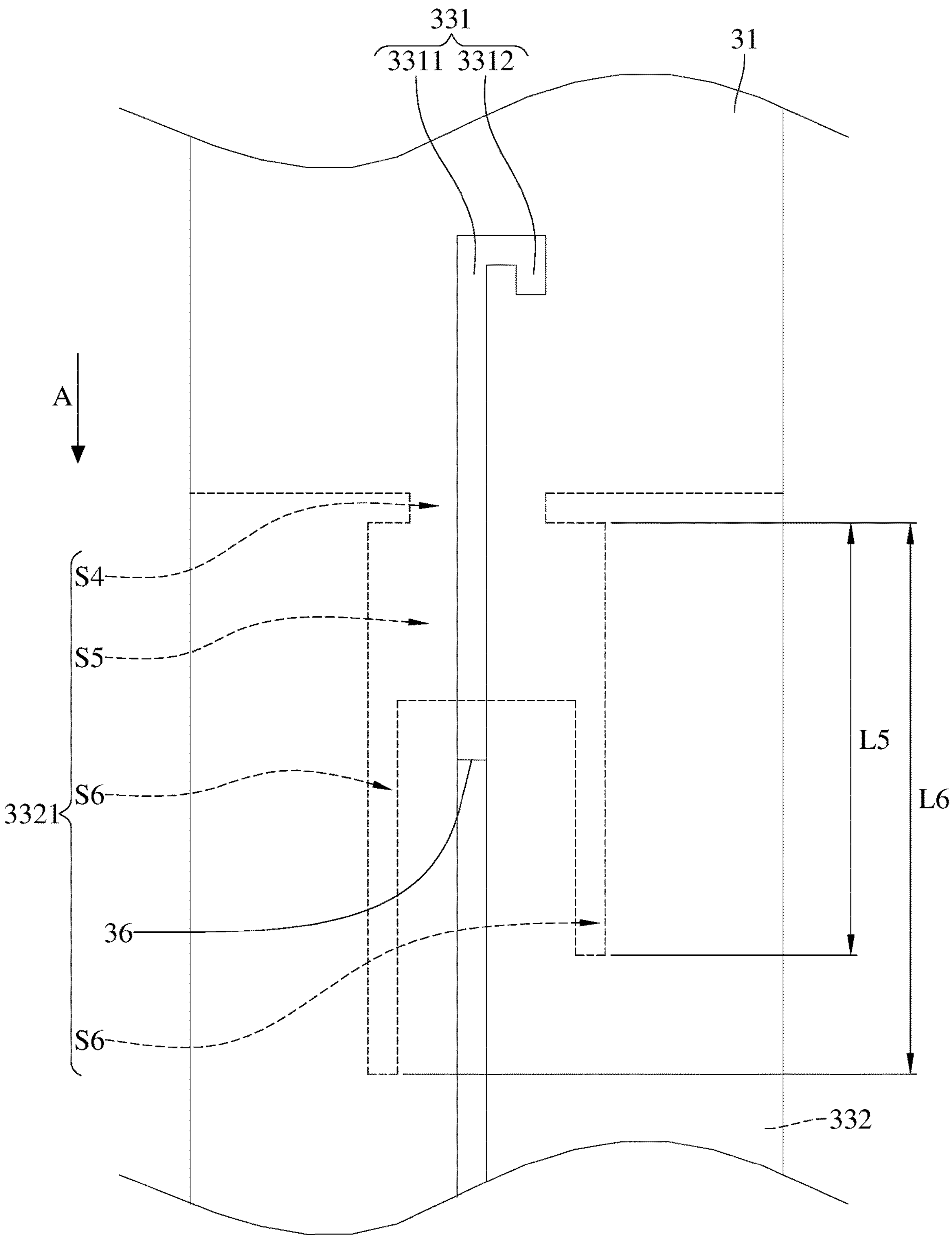
FIG. 4 is a plane view of the substrate and a second antenna component of the electronic device in FIG. 1.
Figure 5:
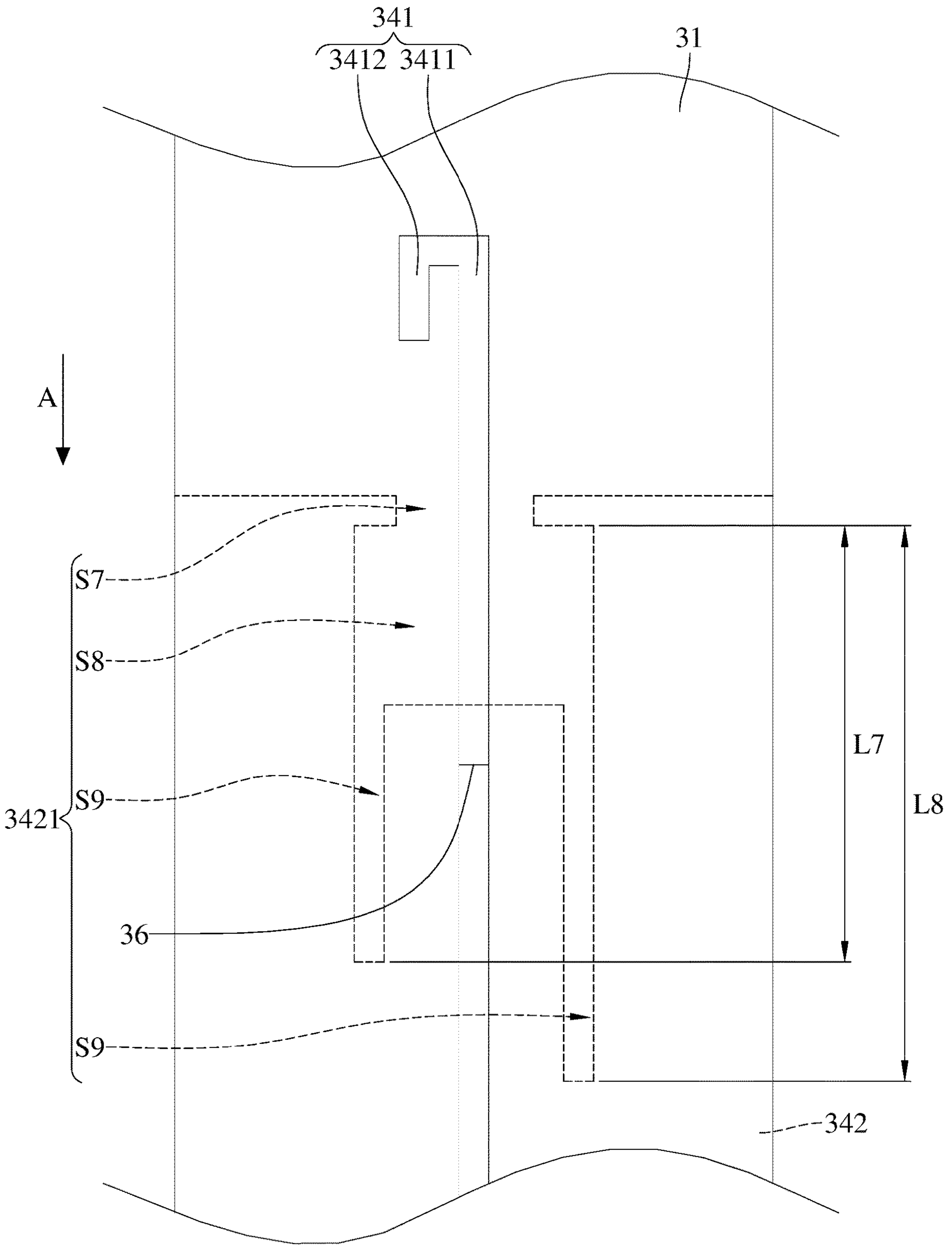
FIG. 5 is a plane view of the substrate and a third antenna component of the electronic device in FIG. 1.

Please refer to FIG. 1 to FIG. 5, where FIG. 3 is a plane view of the substrate 31 and the first antenna component 32 of the electronic device 10 in FIG. 1, FIG. 4 is a plane view of the substrate 31 and the second antenna component 33 of the electronic device 10 in FIG. 1, and FIG. 5 is a plane view of the substrate 31 and the third antenna component 34 of the electronic device 10 in FIG. 1.

Specifically, each first antenna component 32 includes a first radiation portion 321 and a first ground portion 322. The first radiation portion 321 and the first ground portion 322 are disposed on two opposite sides of the substrate 31, respectively. The first radiation portion 321 includes a first body part 3211 and two first head parts 3212. The first body part 3211 extends along the arrangement direction A. The two first head parts 3212 are, for example, L-shaped. A length L1 of one of the two first head parts 3212 and a length L2 of the other first head part 3212 are, for example, different. The two first head parts 3212 are connected to an end of the first body part 3211, and extend along opposite directions, respectively. For example, one of the two first head parts 3212 extends leftward, and the other first head part 3212 extends rightward. The first ground portion 322 has a first notch part 3221. The first notch part 3221 corresponds to the first body part 3211. That is, an orthogonal projection of the first body part 3211 onto the substrate 31 at least partially overlaps with an orthogonal projection of the first ground portion 322 onto the substrate 31.

The first notch part 3221 has a first narrower section S1, a first wider section S2 and two first slit sections S3. The first narrower section S1 is connected to a side of the first wider section S2, and the two first slit sections S3 are connected to a side of the first wider section S2 opposite to the first narrower section S1. The two first slit sections S3 are arranged along the arrangement direction A, and are located on two opposite sides of the first body part 3211, respectively. A length L3 of one of the two first slit sections S3 and a length L4 of the other first slit section S3 are different. The longer first slit section S3 and the shorter first head part 3212 are located on a side (e.g. right side) of the first body part 3211, and the shorter first slit section S3 and the longer first head part 3212 are located on the opposite side (e.g. left side) of the first body part 3211.

Each second antenna component 33 includes a second radiation portion 331 and a second ground portion 332. The second radiation portion 331 and the second ground portion 332 are disposed on two opposite sides of the substrate 31, respectively. The second radiation portion 331 includes a second body part 3311 and a second head part 3312. The second body part 3311 extends along the arrangement direction A. The second head part 3312 is, for example, L-shaped. The second head part 3312 is connected to an end of the second body part 3311. The second ground portion 332 has a second notch part 3321. The second notch part 3321 corresponds to the second body part 3311. That is, an orthogonal projection of the second body part 3311 onto the substrate 31 at least partially overlaps with an orthogonal projection of the second ground portion 332 onto the substrate 31.

The second notch part 3321 has a second narrower section S4, a second wider section S5 and two second slit sections S6. The second narrower section S4 is connected to a side of the second wider section S5, and the two second slit sections S6 are connected to a side of the second wider section S5 opposite to the second narrower section S4. The two second slit sections S6 are arranged along the arrangement direction A, and are located on two opposite sides of the second body part 3311, respectively. A length L5 of one of the two second slit sections S6 and a length L6 of the other second slit section S6 are different. The shorter second slit section S6 and the second head part 3312 are located on a side (e.g. right side) of the second body part 3311.

Each third antenna component 34 includes a third radiation portion 341 and a third ground portion 342. The third radiation portion 341 and the third ground portion 342 are disposed on two opposite sides of the substrate 31, respectively. The third radiation portion 341 includes a third body part 3411 and a third head part 3412. The third body part 3411 extends along the arrangement direction A. The third head part 3412 is, for example, L-shaped. The third head part 3412 is connected to an end of the third body part 3411. An orientation of the third head part 3412 is opposite to an orientation of the second head part 3312. For example, the second head part 3312 extends leftward, and the third head part 3412 extends toward rightward. The third ground portion 342 has a third notch part 3421. The third notch part 3421 corresponds to the third body part 3411. That is, an orthogonal projection of the third body part 3411 onto the substrate 31 at least partially overlaps with an orthogonal projection of the third ground portion 342 onto the substrate 31.

The third notch part 3421 has a third narrower section S7, a third wider section S8 and two third slit sections S9. The third narrower section S7 is connected to a side of the third wider section S8, and the two third slit sections S9 are connected to a side opposite to the third narrower section S7 of the third wider section S8. The two third slit sections S9 are arranged along the arrangement direction A, and are located on two opposite sides of the third body part 3411, respectively. A length L7 of one of the two third slit sections S9 and a length L8 of another one of the two third slit sections S9 are different. The shorter third slit section S9 and the third head part 3412 are located on a same side relative to the third body part 3411.

In this embodiment, the first notch part 3221, the second notch part 3321 and the third notch part 3421 correspond to the two L-shaped first head parts 3212, the L-shaped second head part 3312 and the L-shaped third head part 3412, respectively. In the first antenna subassembly M1, one of the two first antenna components 32, one of the three second antenna components 33 and one of the three third antenna components 34 are arranged sequentially. In the second antenna subassembly M2, the other first antenna component 32, another second antenna component 33, another third antenna component 34, the other second antenna component 33 and the other third antenna component 34 are arranged sequentially. Accordingly, a signal interference and a return loss can be reduced when the first antenna subassembly M1 and the second antenna subassembly M2 transfer signals.

The six isolation components 35 are disposed on the two substrates 31, and are located between the first ground portion 322, the second ground portion 332 and the third ground portion 342. Accordingly, the signal interference can be further reduced via the six isolation components 35 when the first antenna subassembly M1 and the second antenna subassembly M2 transfer signals.

The eight feed points 36 are disposed at the first antenna subassembly M1 and the second antenna subassembly M2, respectively. At least one feed points 36 connects the first radiation portion 321 and the first ground portion 322, at least one feed points 36 connects the second radiation portion 331 and the second ground portion 332, and at least one feeding points 36 connects the third radiation portion 341 and the third ground portion 342. When the signals are fed into the eight feed points 36, they can be radiated outward from the first radiation portion 321, the second radiation portion 331 and the third radiation portion 341, respectively.

In this embodiment, the electronic device 10 further includes a power storage unit 40. The power storage unit 40 is, for example, a battery, and is located in the accommodating space 21. The power storage unit 40 provides electricity to the antenna assembly 30 via one or more cables (not shown) or wireless connection.

Figure 6:
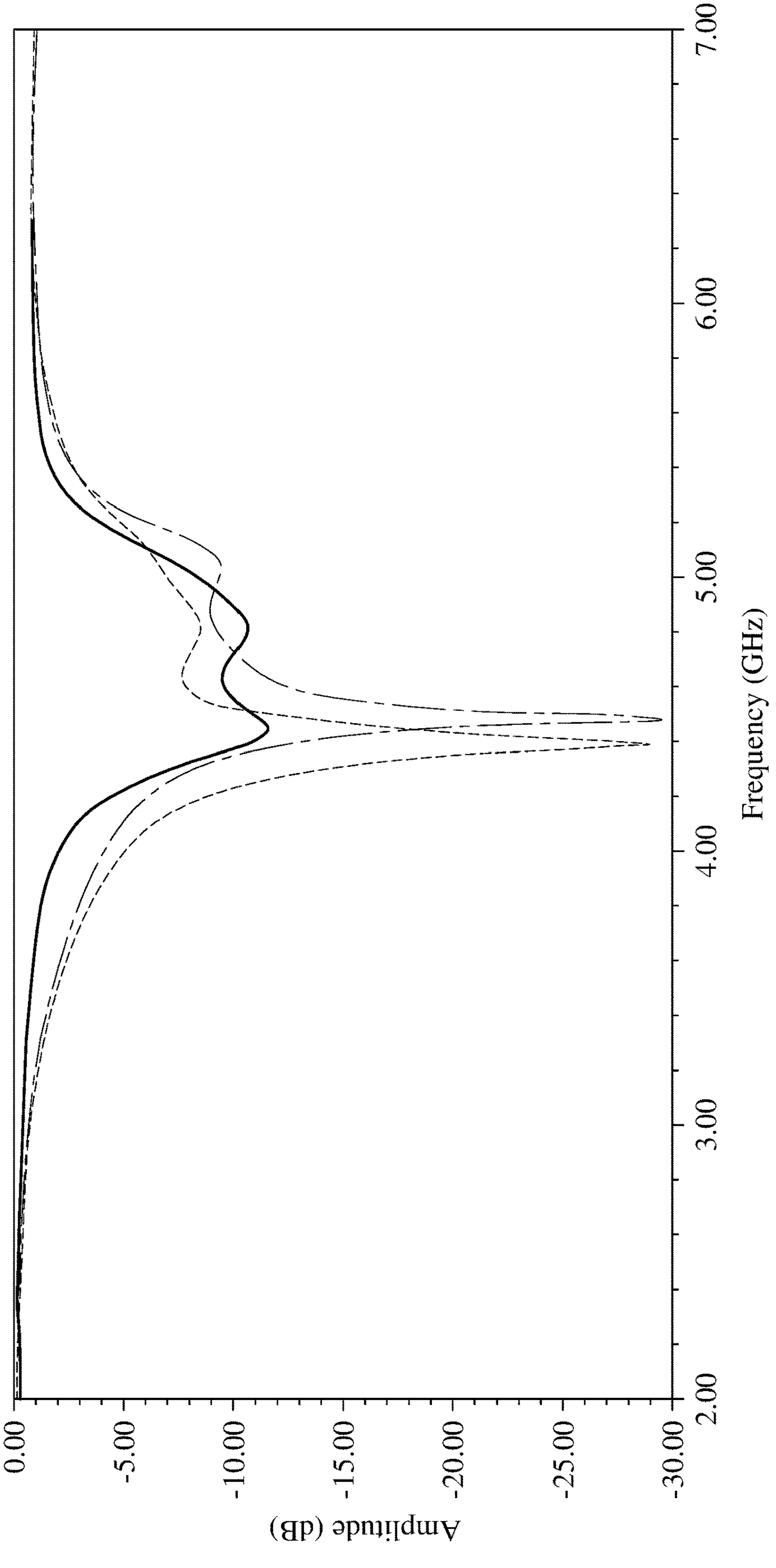
FIG. 6 is a graph showing return loss data of the first antenna subassembly of the electronic device in FIG. 1.
Figure 7:
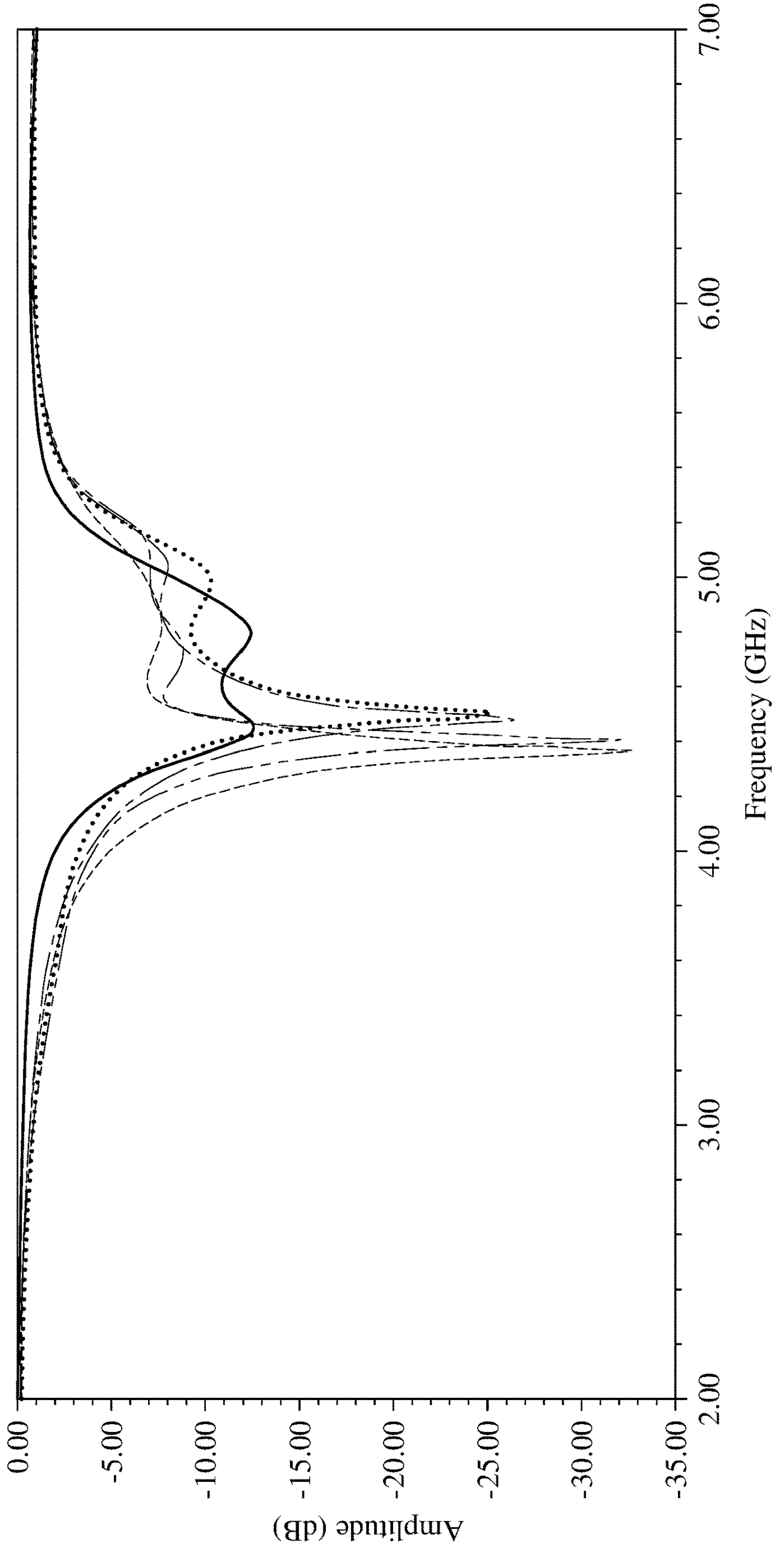
FIG. 7 is a graph showing return loss data of the second antenna subassembly of the electronic device in FIG. 1.
Figure 8:
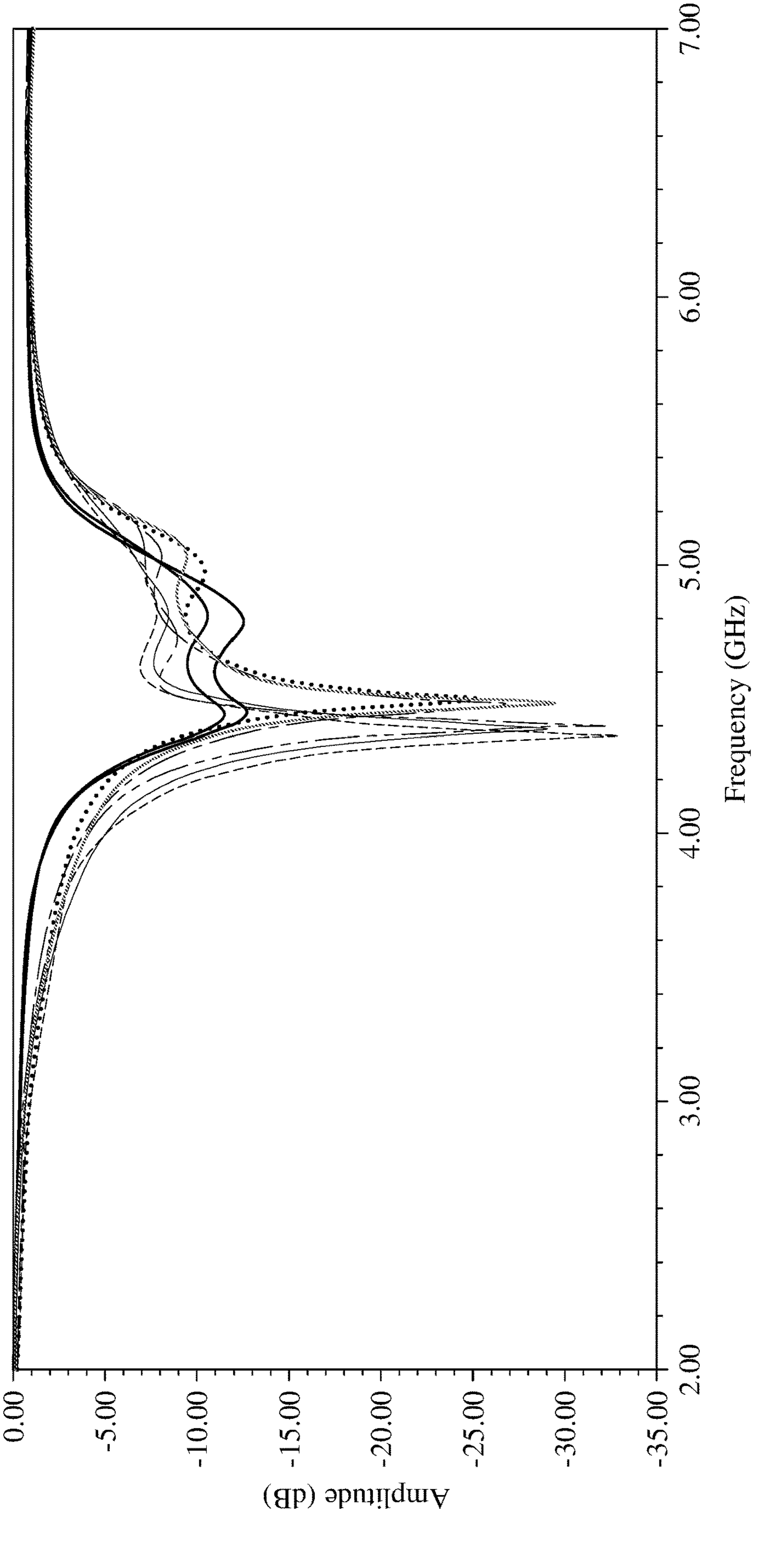
FIG. 8 is a graph showing return loss data of the first antenna subassembly and the second antenna subassembly of the electronic device in FIG. 1.

Please refer to FIG. 6 to FIG. 8, where FIG. 6 is a graph showing return loss data of the first antenna subassembly M1 of the electronic device 10 in FIG. 1, FIG. 7 is a graph showing return loss data of the second antenna subassembly M2 of the electronic device 10 in FIG. 1, and FIG. 8 is a graph showing return loss data of the first antenna subassembly M1 and the second antenna subassembly M2 of the electronic device 10 in FIG. 1.

In a n79 frequency band in a 5G frequency band, the return loss of the first antenna subassembly M1, the return loss of the second antenna subassembly M2 and the return loss of an assembly of the first antenna subassembly M1 and the second antenna subassembly M2 adjacently disposed of the present invention are lower than −6 dB (amplitude) or even lower than −10 dB. Accordingly, the first antenna subassembly M1 and the second antenna subassembly M2 can meet a requirement of an impedance matching in the n79 frequency band in the 5G frequency band via the corresponding relationship between the notch parts 3221, 3321 and 3421 and the L-shaped head parts 3212, 3312 and 3412 and the sequential arrangement of the antenna components 32, 33 and 34.

Figure 9:
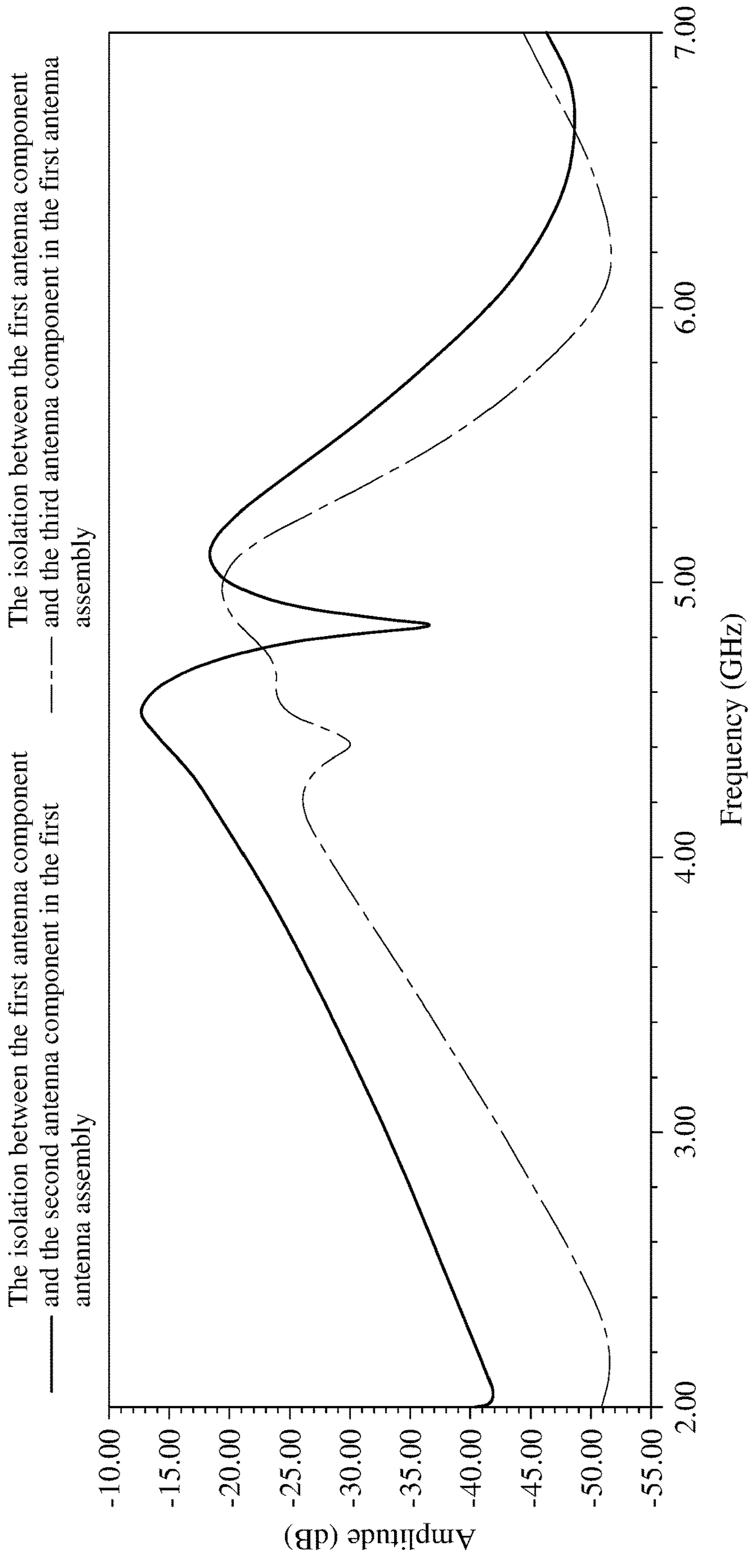
FIG. 9 is a graph showing isolation between the antenna components of the first antenna subassembly of the electronic device in FIG. 1.
Figure 10:
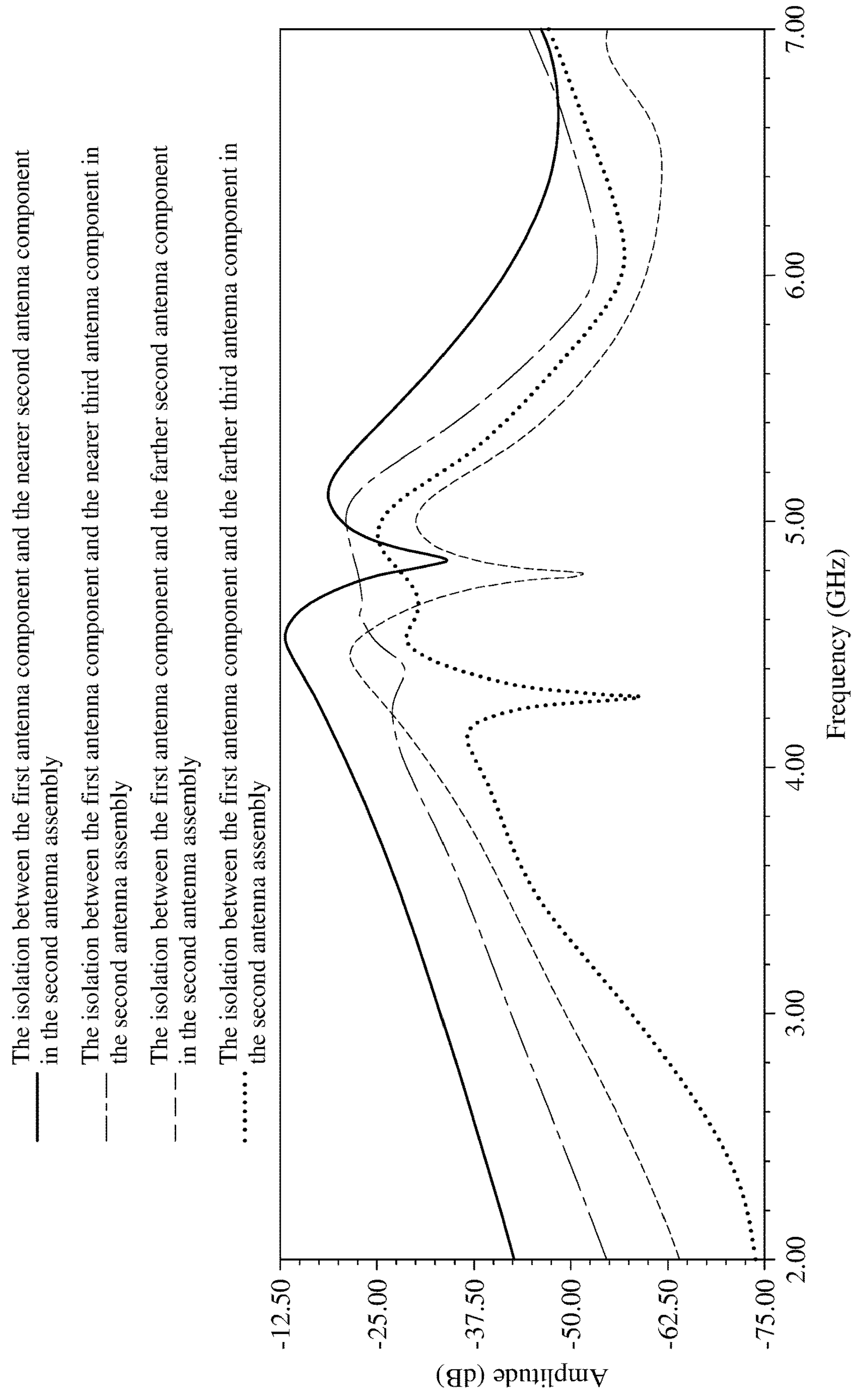
FIG. 10 is a graph showing isolation between the antenna components of the second antenna subassembly of the electronic device in FIG. 1.

Please refer to FIG. 9 and FIG. 10, where FIG. 9 is a graph showing isolation between the antenna components 32, 33, and 34 of the first antenna subassembly M1 of the electronic device 10 in FIG. 1, and FIG. 10 is a graph showing isolation between the antenna components 32, 33, and 34 of the second antenna subassembly M2 of the electronic device 10 in FIG. 1.

In the n79 frequency band in the 5G frequency band, an isolation between the antenna components 32-34 of the first antenna subassembly M1 and an isolation between the antenna components 32-34 of the second antenna subassembly M2 are lower than −13 dB. In addition, an envelope correlation coefficient (ECC) between the antenna components 32-34 of the first antenna subassembly M1 and an ECC between the antenna components 32-34 of the second antenna subassembly M2 are lower than 0.038 (not shown) obtain by magnitude of the isolation. Accordingly, the signal interference between the antenna components 32, 33, and 34 can be reduced via the corresponding relationship between the notch parts 3221, 3321 and 3421 and the L-shaped head parts 3212, 3312 and 3412 and the sequential arrangement of the antenna components 32, 33 and 34.

According to the electronic device and the antenna assembly disclosed by above embodiments, the first notch part, the second notch part and the third notch part correspond to the two first head parts, the second head part and the third head part, respectively. In addition, the first antenna components, the second antenna components and the third antenna components are arranged sequentially. Therefore, the size of the antenna assembly can be reduced without reducing the range of the applicable signal frequency bands of the electronic device, so that the antenna assembly is not required to be redesigned according to the size of the inner space of the smartphone. Thus, the design process of the antenna assembly can be simplified, and the manufacturing cost can be reduced.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. An electronic device, comprising:

a casing, having an accommodating space; and an antenna assembly, located in the accommodating space, wherein the antenna assembly comprises at least one substrate, at least one first antenna component, at least one second antenna component and at least one third antenna component, the at least one first antenna component, the at least one second antenna component and the at least one third antenna component are disposed on the substrate, and the at least one first antenna component, the at least one second antenna component and the at least one third antenna component are arranged along an arrangement direction;

wherein the at least one first antenna component comprises a first radiation portion and a first ground portion, the first radiation portion and the first ground portion are disposed on two opposite sides of the substrate, respectively, the first radiation portion comprises a first body part and two first head parts, the first body part extends along the arrangement direction, the two first head parts are connected to an end of the first body part, the two first head parts extend along opposite directions, respectively, the first ground portion has a first notch part, and the first notch part corresponds to the first body part;

wherein the at least one second antenna component comprises a second radiation portion and a second ground portion, the second radiation portion and the second ground portion are disposed on two opposite sides of the substrate, respectively, the second radiation portion comprises a second body part and a second head part, the second body part extends along the arrangement direction, the second head part is connected to an end of the second body part, the second ground portion has a second notch part, and the second notch part corresponds to the second body part;

wherein the at least one third antenna component comprises a third radiation portion and a third ground portion, the third radiation portion and the third ground portion are disposed on two opposite sides of the substrate, respectively, the third radiation portion comprises a third body part and a third head part, the third body part extends along the arrangement direction, the third head part is connected to an end of the third body part, an orientation of the third head part is opposite to an orientation of the second head part, the third ground portion has a third notch part, and the third notch part corresponds to the third body part.

2. The electronic device according to claim 1, wherein the at least one first antenna component, the at least one second antenna component and the at least one third antenna component are arranged sequentially.

3. The electronic device according to claim 1, wherein the antenna assembly comprises two substrates, two first antenna components, three second antenna components and three third antenna components, one of the two first antenna components, one of the three second antenna component and one of the three third antenna component are arranged on one of the two substrates sequentially to form a first antenna subassembly, and another one of the two first antenna components, another one of the three second antenna components, another one of the three third antenna components, still another one of the three second antenna components and still another one of the three third antenna components are arranged on another one of the two substrates sequentially to form a second antenna subassembly.

4. The electronic device according to claim 3, wherein the antenna assembly comprises six isolation components, the six isolation components are disposed on the two substrates, and the six isolation components are located between the first antenna component, the second antenna component and the third antenna component of the first antenna subassembly and between the first antenna component, the second antenna component, the third antenna component, the second antenna component and the third antenna component of the second antenna subassembly.

5. The electronic device according to claim 1, wherein lengths of the two first head parts are different.

6. The electronic device according to claim 5, wherein the first notch part has a first narrower section, a first wider section and two first slit sections, the first narrower section and the two first slit sections are connected to two opposite sides of the first wider section, respectively, the two first slit sections extend along the arrangement direction, the two first slit sections are located on two opposite sides of the first body part, respectively, lengths of the two first slit sections are different, the first slit section that is longer and the first head part that is shorter are located on a side of the first body part, and the first slit section that is shorter and the first head part that is longer are located on an opposite side of the first body part.

7. The electronic device according to claim 5, wherein the second notch part has a second narrower section, a second wider section and two second slit sections, the second narrower section and the two second slit sections are connected to two opposite sides of the second wider section, respectively, the two second slit sections extend along the arrangement direction, the two second slit sections are located on two opposite sides of the second body part, respectively, lengths of the two second slit sections are different, and the second slit section that is shorter and the second head part are located on a side of the second body part.

8. The electronic device according to claim 5, wherein the third notch part has a third narrower section, a third wider section and two third slit sections, the third narrower section and the two third slit sections are connected to two opposite sides of the third wider section, respectively, the two third slit sections extend along the arrangement direction, the two third slit sections are located on two opposite sides of the third body part, respectively, lengths of the two third slit sections are different, and the third slit section that is shorter and the third head part are located on a side of the third body part.

9. The electronic device according to claim 1, wherein the two first head parts, the second head part and the third head part are L-shaped.

10. An antenna assembly, comprising:

at least one substrate, at least one first antenna component, at least one second antenna component and at least one third antenna component, wherein the at least one first antenna component, the at least one second antenna component and the at least one third antenna component are disposed on the substrate, and the at least one first antenna component, the at least one second antenna component and the at least one third antenna component are arranged along an arrangement direction;

wherein the at least one first antenna component comprises a first radiation portion and a first ground portion, the first radiation portion and the first ground portion are disposed on two opposite sides of the substrate, respectively, the first radiation portion comprises a first body part and two first head parts, the first body part extends along the arrangement direction, the two first head parts are connected to an end of the first body part, the two first head parts extend along opposite directions, respectively, the first ground portion has a first notch part, and the first notch part corresponds to the first body part;

wherein the at least one second antenna component comprises a second radiation portion and a second ground portion, the second radiation portion and the second ground portion are disposed on two opposite sides of the substrate, respectively, the second radiation portion comprises a second body part and a second head part, the second body part extends along the arrangement direction, the second head part is connected to an end of the second body part, the second ground portion has a second notch part, and the second notch part corresponds to the second body part;

wherein the at least one third antenna component comprises a third radiation portion and a third ground portion, the third radiation portion and the third ground portion are disposed on two opposite sides of the substrate, respectively, the third radiation portion comprises a third body part and a third head part, the third body part extends along the arrangement direction, the third head part is connected to an end of the third body part, an orientation of the third head part is opposite to an orientation of the second head part, the third ground portion has a third notch part, and the third notch part corresponds to the third body part.

* * * * *